United States Patent [19]

Shue et al.

[11] Patent Number: 4,489,129

[45] Date of Patent: Dec. 18, 1984

[54] POLYMER-COATED REINFORCEMENTS

[75] Inventors: Robert S. Shue, Bartlesville; Faber B. Jones, Nowata, both of Okla.

[73] Assignee: Phillips Petroleum Company, Bartlesville, Okla.

[21] Appl. No.: 401,031

[22] Filed: Jul. 22, 1982

[51] Int. Cl.$^3$ ............................................. C08L 81/04
[52] U.S. Cl. ................................. 428/366; 427/385.5; 427/389.7; 427/389.8; 427/389.9; 428/367; 428/368; 428/378; 428/394; 523/205; 523/209; 523/215; 524/609
[58] Field of Search ............... 428/366, 367, 368, 394, 428/378; 523/205, 209, 215; 524/609; 427/385.5, 389.7, 389.9, 389.8, 393.6, 434.5, 434.6; 525/420, 437

[56] References Cited

U.S. PATENT DOCUMENTS

| | | | |
|---|---|---|---|
| 3,508,950 | 4/1970 | Marzocchi | 523/215 |
| 3,957,716 | 5/1976 | Weldy | 523/468 |
| 4,355,059 | 10/1982 | Blackwell | 427/389.7 |
| 4,364,993 | 12/1982 | Edelman et al. | 428/367 |

FOREIGN PATENT DOCUMENTS

| | | | |
|---|---|---|---|
| 51-12861 | 1/1976 | Japan | 524/609 |
| 56-90837 | 7/1981 | Japan | 524/609 |
| 56-135549 | 10/1981 | Japan | 524/609 |
| 57-23655 | 2/1982 | Japan | 524/609 |

OTHER PUBLICATIONS

Chemical Abstracts; vol. 95; 1981; p. 50; 95:170458j.

*Primary Examiner*—Lewis T. Jacobs

[57] ABSTRACT

Reinforcements such as, for example, carbon fibers, are coated with a poly(arylene sulfide). The poly(arylene sulfide) is cured in place on the reinforcement. The reinforcement can be used in compositions such as, for example, poly(arylene sulfide) compositions.

57 Claims, No Drawings

POLYMER-COATED REINFORCEMENTS

This invention relates to reinforcements. In another aspect the invention relates to reinforcements for use in plastics such as, for example, poly(arylene sulfide) compositions. A third aspect of this invention relates to the improvement of properties, such as strength, stiffness and fatigue life, of plastics such as, for example, poly(arylene sulfide) compositions.

BACKGROUND

Reinforcements are used in plastics to improve many properites of the compositions. These reinforcements are usually in the form of fibers but can be in other forms such as, for example, powders and beads. The incorporation of carbon fibers, for example, into a poly(arylene sulfide) composition, improves strength, stiffness and fatigue life.

In view of the value and utility of reinforcements, persons of skill in the art of plastic compositions seek to discover and use new and improved reinforcements. It is known, for example, that the reinforcement utility of carbon fibers can be improved by sizing the fibers with polyvinylpyrrolidone. We also seek to improve the reinforcements that can be used in plastic compositions and our invention represents such a contribution to the art.

SUMMARY OF THE INVENTION

In accordance with our invention reinforcements are sized or treated with a curable polymer such as, for example, poly(phenylene sulfide) and subjected to conditions sufficient to cure the polymer. The cured polymer-treated reinforcements can be incorporated into a plastic. It is preferred that the plastic be a polymer characterized by the same type of polymeric repeating units that characterize the curable polymer with which the reinforcement was sized or treated.

OBJECTS OF THE INVENTION

It is an object of this invention to improve the utility of reinforcements employed in plastic compositions.

This object and other objects and advantages will be apparent to those of skill in the art who study this disclosure and the appended claims.

DETAILED DESCRIPTION

In accordance with our invention reinforcements are treated with a curable polymer such as, for example, poly(phenylene sulfide) and then subjected to conditions sufficient to cure the polymer. The reinforcements produced in this manner can be incorporated into a plastic to improve strength, stiffness, fatigue life and other properties of the plastic. Suitable plastics include both the thermosetting and thermoplastics types.

It is preferred that the reinforcements be incorporated into a plastic that is a polymer characterized by the same type of polymeric repeating units which characterize the curable polymer with which the reinforcements were treated. For example, a cured poly(phenylene sulfide)-treated reinforcement is preferably incorporated into a poly(phenylene sulfide).

The reinforcements contemplated to be within the scope of our invention include, but are not limited to, those reinforcements presently known in the art such as, for example, carbon, glass, boron, silica, quartz, asbestos, mica and organic material (e.g. nylon, polyester, etc.). It is desirable to select a reinforcement to which the curable polymer readily adheres. It is also desirable to select a reinforcement that will not be significantly damaged by the curing agent or temperature. Carbon is preferred because poly(arylene sulfide) adheres well to carbon and it has excellent reinforcement properties. Although our invention is not limited to any particular reinforcement sizes or shapes, it is recognized that fibers are generally best suited for most applications and give the best results. The fibers can be long or continuous or they can be chopped into shorter lengths. The fibers can range in length, for example, from a fraction of an inch to many yards. There is no limitation on the length of the fiber. Powders, beads and other shapes and forms also fall within the scope of our invention.

The reinforcements can be treated with the curable polymer in any of many ways. It is presently preferred, because of ease and completeness of application, to pass the reinforcements through an aqueous slurry of the curable polymer. Examples of other suitable methods include coating the reinforcements with molten polymer or with a solution containing the polymer. In the presently preferred embodiment of this invention carbon fibers are sized by passing a continuous carbon filament through an aqueous slurry of poly(phenylene sulfide). Fibers are produced by cutting the continuous filament to the desired length.

The flow rate of the curable polymer used to treat the reinforcement should not be so low that a good coating of the reinforcement cannot be obtained. Although our invention is not limited thereto, the flow rate of a poly(arylene sulfide) used for this purpose should generally be above about 150 grams/10 min as measured in accordance with ASTM Test Method D1238, Procedure B modified to use a 5 kg weight and a temperature of 600° F. (316° C.). We prefer using a poly(arylene sulfide) (such as, for example, poly(phenylene sulfide)) having a flow rate ranging from about 2,000 to about 6,000 grams/10 min. (measured as described above) because within this range the material is fluid enough to flow well and make an even coating yet sufficiently viscous to maintain its integrity during the curing operation.

The curable polymer used to treat the reinforcement can be any uncured or partially cured polymer, the molecular weight of which can be increased by either lengthening of a molecular chain or by crosslinking or by combination of both by, for example, supplying to the polymer a curing agent and/or sufficient energy (such as, for example, heat). The polymer can be a homopolymer, copolymer, terpolymer or the like. The polymer can also be a blend of such polymers. Suitable polymers include, but are not limited to, poly(arylene sulfide) polymers. Suitable poly(arylene sulfide) polymers include, but are not limited to, those polymers disclosed in U.S. Pat. No. 3,354,129, incorporated by reference herein. Poly(phenylene sulfide) is the preferred polymer because our own experiments have demonstrated its substantial utility. Poly(phenylene sulfide) is also preferred because of its availability and desirable properties such as high chemical resistance, nonflammability and high strength and hardness.

The polymer-treated reinforcements are subjected to conditions sufficient to cure the polymer coating. For the purposes of our disclosure and claims the word curing is intended to mean any process whereby the molecular weight of the polymer is increased by either lengthening of a molecular chain or by crosslinking or by combination of both by, for example, supplying to the polymer a curing agent and/or sufficient energy (such as, for example, heat). The cure is necessary because the reinforcements are likely to later be subjected to high temperatures that could otherwise cause the polymer coating to flow off of the reinforcements. For example, high temperatures can be encountered when incorporating the polymer-treated reinforcements into the plastic or subsequently when the plastic is molded, extruded or otherwise processed. The polymer coating should be cured to the extent necessary to substantially maintain the coating on the reinforcement. It is important to note that a complete cure (i.e. no more lengthening or crosslinking possible) is not usually necessary. Any set of conditions sufficient to effect a suitable cure can be employed. With respect to poly(arylene sulfide) we recommend curing by subjecting the polymer to a temperature of at least about 450° F. in air. The higher the curing temperature the shorter the curing time need be.

The amount of polymer coating on the reinforcement after curing can vary widely. Although our invention is not limited thereto it is contemplated that for most purposes the weight percentage of polymer coating will range from about 0.1 to about 10 weight percent. The presently preferred range, especially for fibers, is about 6 to about 8 weight percent. The above weight percentages are based upon the total weight of the polymer coating and the reinforcement.

After a satisfactory cure has been effected the reinforcements can be incorporated into any plastic. Although our invention is not limited thereto, the reinforcements of our invention are best suited for reinforcement of plastics that are polymers characterized by the same type of polymeric repeating units which characterize the curable polymers used to treat those reinforcements. For example, reinforcements that are treated with poly(phenylene sulfide) are best suited for incorporation into poly(phenylene sulfide) compositions. Similarly, reinforcements that are treated with a butadiene/styrene copolymer are best suited for incorporation into a copolymer derived from butadiene and styrene monomers.

The preferred reinforcements of our invention, i.e. those treated with a poly(arylene sulfide) which most preferably is poly(phenylene sulfide), are well suited for reinforcement of poly(arylene sulfide) compositions. The poly(arylene sulfide) into which the reinforcements can be incorporated included any uncured or partially cured poly(arylene sulfide) whether homopolymer, copolymer, terpolymer, and the like, or a blend of such polymers. This uncured or partially cured polymer is a polymer, the molecular weight of which can be increased by either lengthening of a molecular chain or by crosslinking or by combination of both by supplying thereto sufficient energy, such as heat. Suitable poly(arylene sulfide) polymers include, but are not limited to, those described in U.S. Pat. No. 3,354,129, incorporated by reference herein. The reinforcements of our invention are especially well suited for the reinforcement of a poly(arylene sulfide) having a melt flow not exceeding about 1000 grams/10 min. as measured in accordance with ASTM Test Method D1238, Procedure B modified to use a 5 kg weight and a temperature of 600° F. (316° C.).

Examples of poly(arylene sulfide) compositions suitable for receiving the treated reinforcements of our invention include poly(2,4-tolylene sulfide), poly(4,4'-biphenylene sulfide) and poly(phenylene sulfide). Because of its availability and desirable properties (such as high chemical resistance, nonflammability, and high strength and hardness) poly(phenylene sulfide) is the presently preferred poly(arylene sulfide) for this purpose.

The weight percentage of the coated reinforcements incorporated into the plastic will depend in great part upon the intended use of the plastic. Generally the weight percentage of the coated reinforcements will range from about 2 to about 75 weight percent and more usually between about 10 and about 65 weight percent. The above weight percentages are based upon the total weight of the coated reinforcements and the plastic.

The coated reinforcements can be incorporated into the plastic in accordance with any method that will yield a good mixture. Many suitable mixing techniques are well known in the art. By way of non-limiting example, the treated reinforcements and the plastic can be mixed in a conventional metal drum and then extruded at a temperature in excess of about the melting point of the plastic.

The following example is given to facilitate the disclosure of our invention and should not be interpreted to unduly limit the scope of our invention.

EXAMPLE

This example describes a procedure used to prepare and evaluate one of the compositions of our invention and a control composition.

Carbon Fiber Sizing

A mixture of 1500 grams poly(phenylene sulfide), 3500 grams distilled water and 52.5 grams of an ethoxylated castor oil (wetting agent) was ball-milled overnight at ambient room temperature. The poly(phenylene sulfide) had a melt flow of about 2000 to 6000 grams/10 min. as measured according to ASTM Test Method D1238, Procedure B modified to use a 5 kg weight and a 600° F. temperature.

Carbon fibers were passed through this poly(phenylene sulfide) slurry for complete immersion and wetting. The poly(phenylene sulfide)-treated fibers were heated at about 550° F. (287° C.) to evaporate water and to melt the poly(phenylene sulfide) for better fiber wetting. The treated fibers were then heated in an air circulating oven at 700° F. (371° C.) for 45 minutes to effect the desired cure of the poly(phenylene sulfide) coating. The weight percentage of poly(phenylene sulfide) coating was about 7 weight percent based upon the total amount of poly(phenylene sulfide) coating and carbon fiber.

Compounding and Evaluation 200 grams of poly(phenylene sulfide)-sized carbon fibers and 800 grams of poly(phenylene sulfide) (flow rate of about 120±20 grams/10 min. measured as described above) were mixed together in a plastic lined metal drum and extruded at 600° F. (316° C.) through a Davis Standard 1.5 inch extruder having a mixing screw used at a speed of 100 rpm. The mixture was ground to a granular or coarse powder, dried in an oven at 350° F. (177° C) for 3 hours and molded into bar specimens using a New Britain molding machine (barrel 600° F., mold 275° F.). The bars were standard ASTM specimens.

The above-described compounding procedure was repeated using, in place of our poly(phenylene sulfide)- sized carbon fibers, commercial (PVP) polyvinylpyrrolidone-sized carbon fibers known in the trade as Celion® from the Celanese Corporation of Summit, N. J. The bars prepared from this composition were similarly evaluated.

The results of our evaluatin of the bars are listed in Table I. Note that the poly(phenylene sulfide)-sized carbon fiber outperformed the polyvinylpyrrolidone-sized carbon fibers in most areas. The polyvinylpyrrolidine-sized fibers achieved better results only in the flexural modulus test.

TABLE I
EFFECT OF SIZING TYPE
ON CARBON FIBER REINFORCED PPS COMPOSITIONS

Composition: 200 grams sized ¼ in. carbon fiber
800 grams poly(phenylene sulfide)

| Properties | ASTM Test Method | Polyvinyl-pyrroli-done-Sized Carbon Fiber | Poly(phenylene Sulfide) Sized Carbon Fiber |
|---|---|---|---|
| 1. Density, g/cc[a] | D1505 | 1.3933 | 1.3969 |
| 2. Flexural Modulus, MPa[b] | D790 | 16,358 | 15,474 |
| 3. Flexural Strength, MPa[b] | D790 | 184.8 | 210.2 |
| 4. Tensile Break, MPa[b] | D638 | 129.9 | 154.1 |
| 5. Elongation, %[b] | D638 | .91 | 1.01 |
| 6. Hardness, Shore D[a] | — | 90 | 90 |
| 7. Izod Impact, J/m, | | | |
| Notched[c] | D256 | 58.9 | 59.0 |
| Unnotched[c] | | 202 | 251 |
| 8. Heat Distortion, °C. @ 1820 Kpa[d] | D648 | 251 | 254 |

Footnotes:
[a]Result of a single test.
[b]Average of 3 tests.
[c]Average of 6 tests.
[d]Average of 2 tests.

We claim:

1. An article of manufacture comprising a reinforcement sized with poly(arylene sulfide); wherein said poly(arylene sulfide) is subsequently cured; and wherein the flow rate of said poly(arylene sulfide) is above about 150 grams/10 min. as measured in accordance with ASTM Test Method D1238, Procedure B modified to use a 5 kg weight and a temperature of 600° F.

2. An article of manufacture as recited in claim 1 wherein said poly(arylene sulfide) is poly(phenylene sulfide).

3. An article of manufacture as recited in claim 1 or claim 2 wherein said reinforcement is selected from carbon, glass, boron, silica, quartz, asbestos, mica, nylon and polyester.

4. An article of manufacture as recited in claim 1 or claim 2 wherein said reinforcement is a fiber.

5. An article of manufacture as recited in claim 4 wherein said reinforcement is carbon fiber.

6. An article of manufacture as recited in claim 4 wherein the weight percentage of said cured poly(arylene sulfide) coating is within the range of about 0.1 to about 10 weight percent based upon the total amount of said coating and said reinforcement.

7. A method comprising (i) sizing a reinforcement with poly(arylene sulfide) and (ii) curing said poly(arylene sulfide) on said reinforcement; wherein the flow rate of said poly(arylene sulfide) is above about 150 grams/10 min. as measured in accordance with ASTM Test Method D1238, Procedure B modified to use a 5 kg weight and a temperature of 600° F.

8. A method as recited in claim 7 wherein said poly(arylene sulfide) is poy(phenylene sulfide).

9. A method as recited in claim 7 or claim 8 wherein said reinforcement is selected from carbon, glass, boron, silica, quartz, asbestos, mica, nylon and polyester.

10. A method as recited in claim 7 or claim 8 wherein said reinforcement is fiber.

11. A method as recited in claim 10 wherein said reinforcement is carbon fiber.

12. A method as recited in claim 10 wherein, after said curing, the weight percentage of said poly(arylene sulfide) is within the range of about 0.1 to about 10 weight percent based upon the total amount of said poly(arylene sulfide) and said fiber.

13. A method as recited in claim 12 wherein the flow rate of said poly(arylene sulfide) is within the range of about 2,000 to about 6,000 grams/10 min as measured in accordance with ASTM Test Method D1238, Procedure B modified to use a 5 kg weight and a temperature of 600° F.

14. A method as recited in claim 7 or claim 8 further comprising (iii) incorporating said reinforcement with said cured poly(arylene sulfide) into a plastic.

15. A method as recited in claim 14 wherein said plastic is poly(arylene sulfide).

16. A method as recited in claim 14 wherein said plastic is poly(phenylene sulfide).

17. A method as recited in claim 16 wherein said reinforcement is fiber.

18. A method as recited in claim 17 wherein said reinforcement is carbon fiber.

19. A method as recited in claim 17 wherein the flow rate of said plastic does not exceed about 1000 grams/10 min as measured in accordance with ASTM Test Method D1238, Procedure B modified to use a 5 kg weight and a temperature of 600° F.

20. The composition produced in accordance with the method of claim 7.

21. The composition produced in accordance with the method of claim 8.

22. The composition produced in accordance with the method of claim 10.

23. The composition produced in accordance with the method of claim 10.

24. The composition produced in accordance with the method of claim 11.

25. The composition produced in accordance with the method of claim 12.

26. The composition produced in accordance with the method of claim 13.

27. The composition produced in accordance with the method of claim 14.

28. The composition produced in accordance with the method of claim 15.

29. The composition produced in accordance with the method of claim 16.

30. The composition produced in accordance with the method of claim 17.

31. The composition produced in accordance with the method of claim 18.

32. The composition produced in accordance with the method of claim 19.

33. A composition comprising a reinforcement incorporated into a plastic wherein said reinforcement is sized with a poly(arylene sulfide) and said poly(arylene sulfide) is subsequently cured and wherein said plastic is a polymer characterized by the same type of polymeric repeating units which characterize said poly(arylene sulfide).

34. A composition as recited in claim 33 wherein said poly(arylene sulfide) is a poly(phenylene sulfide).

35. A composition as recited in claim 33 or 34 wherein said reinforcement is a continuous fiber.

36. A composition comprising an article of manufacture as recited in claim 1 or claim 2 which has been incorporated into plastic.

37. A composition as recited in claim 36 wherein said plastic is poly(arylene sulfide).

38. A composition as recited in claim 36 wherein said plastic is poly(phenylene sulfide).

39. A composition comprising an article of manufacture as recited in claim 1 or claim 2 which has been incorporated into plastic; wherein said reinforcement is a continuous fiber.

40. A composition as recited in claim 37 wherein the weight percentage of said coated reinforcement is within the range of about 10 to about 65 weight percent based upon the total amount of coated reinforcement and plastic.

41. A method comprising (i) sizing a reinforcement with a poly(arylene sulfide), (ii) curing said poly(arylene sulfide) on said reinforcement and (iii) subsequently incorporating said reinforcement into a polymer characterized by the same type of polymeric repeating units which characterize said poly(arylene sulfide).

42. A method as recited in claim 41 wherein said curing is accomplished, at least in part, by heating said poly(arylene sulfide).

43. A method as recited in claim 42 wherein said poly(arylene sulfide) is poly(phenylene sulfide) having a flow rate within the range of about 2,000 to about 6,000 grams/10 min; wherein said polymer into which said reinforcement is incorporated is poly(phenylene sulfide) having a flow rate not exceeding about 1,000 grams/10 min; and wherein said flow rates are measured in accordance with ASTM Test Method D1238, Procedure B modified to use a 5 kg weight and a temperature of 600° F.

44. A method as recited in claim 41 further comprising (iii) incorporating said fiber into a plastic.

45. A method as recited in claim 44 wherein said plastic is poly(phenylene sulfide).

46. A composition comprising an article of manufacture as recited in claim 36 wherein said reinforcement is selected from carbon, glass, boron, silica, quartz, asbestos, mica, nylon and polyester.

47. A composition comprising an article of manufacture as recited in claim 36 wherein said reinforcement is a fiber.

48. A composition comprising an article of manufacture as recited in claim 47 wherein said reinforcement is carbon fiber.

49. A composition comprising an article of manufacture as recited in claim 47 wherein the weight percentage of said cured poly(arylene sulfide) coating is within the rangeof about 0.1 to about 10 weight percent based upon the total amount of said coating and said reinforcement.

50. A method comprising (i) sizing a fiber with a poly(arylene sulfide) by passing said fiber through an aqueous slurry of said poly(arylene sulfide), and (ii) curing the poly(arylene sulfide) sizing on said fiber.

51. A method as recited in claim 50 wherein said fiber is a continuous fiber.

52. A method as recited in claim 51 wherein said fiber is carbon.

53. A method as recited in claim 50, 51 or 52 wherein said poly(arylene sulfide) is poly(phenylene sulfide).

54. An article of manufacture comprising a reinforcement in the form of a fiber, powder or bead sized with poly(arylene sulfide); wherein said poly(arylene sulfide) is subsequently cured; and wherein the flow rate of said poly(arylene sulfide) is above about 150 grams/10 min. as measured in accordance with ASTM Test Method D1238, Procedure B modified to use a 5 kg weight and a temperature of 600° F.

55. A method comprising (i) sizing a reinforcement in the form of a fiber, powder or bead with poly(arylene sulfide) and (ii) curing said poly(arylene sulfide) on said reinforcement; wherein the flow rate of said poly(arylene sulfide) is above 150 grams/10 min. as measured in accordance with ASTM Test Method D1238, Procedure B modified to use a 5 kg weight and a temperature of 600° F.

56. A composition comprising a reinforcemet in the form of a fiber, powder or bead incorporated into a plastic wherein said reinforcement is sized with a poly(arylene sulfide) and said poly(arylene sulfide) is subsequently cured and wherein said plastic is a polymer characterized by the same type of polymeric repeating units which characterize said poly(arylene sulfide).

57. A method comprising (i) sizing a reinforcement in the form of a fiber, powder or bead with a poly(arylene sulfide), (ii) curing said poly(arylene sulfide) on said reinforcement and (iii) subsequently incorporating said reinforcement into a polymer characterized by the same type of polymeric repeating units which characterize said poly(arylene sulfide).

* * * * *

UNITED STATES PATENT AND TRADEMARK OFFICE
CERTIFICATE OF CORRECTION

PATENT NO. : 4,489,129

DATED : December 18, 1984

INVENTOR(S) : Robert S. Shue and Faber B. Jones

It is certified that error appears in the above-identified patent and that said Letters Patent are hereby corrected as shown below:

Col. 6, line 45, delete "10" and substitute ---9---.

Col. 7, line 46, delete "41" and substitute ---53---.

Col. 8, line 35, after "above" and before "150", insert ---about---.

Col. 8, line 39, delete "reinforcemet" and substitute ---reinforcement---.

Signed and Sealed this

Thirtieth Day of July 1985

[SEAL]

Attest:

DONALD J. QUIGG

Attesting Officer

Acting Commissioner of Patents and Trademarks